United States Patent
Hinatsu et al.

(10) Patent No.: US 8,288,888 B2
(45) Date of Patent: Oct. 16, 2012

(54) POWER DISPATCH SYSTEM FOR ELECTROLYTIC PRODUCTION OF HYDROGEN FROM WIND POWER

(75) Inventors: Jim Hinatsu, Mississauga (CA); Michael Stemp, Toronto (CA); William Stewart, Priceville (CA)

(73) Assignee: Next Hydrogen Corporation (CA)

( * ) Notice: Subject to any disclaimer, the term of this patent is extended or adjusted under 35 U.S.C. 154(b) by 313 days.

(21) Appl. No.: 12/606,517

(22) Filed: Oct. 27, 2009

(65) Prior Publication Data

US 2010/0114395 A1    May 6, 2010

Related U.S. Application Data

(60) Provisional application No. 61/193,124, filed on Oct. 30, 2008.

(51) Int. Cl.
*H02J 1/14* (2006.01)
(52) U.S. Cl. .............................. 307/24; 307/38; 307/39
(58) Field of Classification Search .................. 307/18, 307/24, 38–39
See application file for complete search history.

(56) References Cited

U.S. PATENT DOCUMENTS

| | | | |
|---|---|---|---|
| 5,512,145 A * | 4/1996 | Hollenberg | 205/628 |
| 5,592,028 A | 1/1997 | Pritchard | |
| 6,864,596 B2 * | 3/2005 | Maiwald et al. | 290/54 |
| 6,912,450 B2 * | 6/2005 | Fairlie et al. | 700/273 |
| 6,956,300 B2 * | 10/2005 | Gizara | 290/43 |
| 7,060,379 B2 * | 6/2006 | Speranza et al. | 429/9 |
| 7,062,360 B2 * | 6/2006 | Fairlie et al. | 700/286 |
| 7,075,189 B2 | 7/2006 | Heronemus et al. | |
| 7,088,012 B2 * | 8/2006 | Gizara | 290/43 |
| 7,199,482 B2 | 4/2007 | Hopewell | |
| 7,245,039 B2 * | 7/2007 | DuHamel | 290/44 |
| 7,353,085 B2 | 4/2008 | Rusta-Sallehy et al. | |
| 7,397,142 B1 * | 7/2008 | Cooper | 290/44 |
| 7,759,812 B2 * | 7/2010 | Taylor et al. | 290/44 |
| 7,892,407 B2 * | 2/2011 | Gibson et al. | 204/228.1 |
| 7,906,007 B2 * | 3/2011 | Gibson et al. | 205/637 |
| 8,003,268 B2 * | 8/2011 | Smith | 429/418 |
| 2002/0033332 A1 * | 3/2002 | Handa | 204/230.2 |
| 2004/0131902 A1 * | 7/2004 | Frank et al. | 429/21 |

(Continued)

FOREIGN PATENT DOCUMENTS

| | | | | |
|---|---|---|---|---|
| JP | 07233493 | A | * | 9/1995 |
| JP | 2002371396 | A | * | 12/2002 |
| JP | 2003317763 | A | * | 11/2003 |
| JP | 2005330515 | A | * | 12/2005 |
| JP | 2006345649 | A | * | 12/2006 |
| WO | WO 9940030 | A2 | * | 8/1999 |

OTHER PUBLICATIONS

Notification of Transmittal of the International Search Report and the Written Opinion for PCT/CA2009/001530 (Jan. 29, 2010).

*Primary Examiner* — Adi Amrany
(74) *Attorney, Agent, or Firm* — Harness, Dickey & Pierce, P.L.C.

(57) ABSTRACT

A method for controlling the distribution of electric power from a wind farm to a plurality of hydrogen producing electrolysers. The method includes estimating available DC power from the wind farm, which is controlled independently from the hydrogen producing electrolysers. A target current set point is determined for each electrolyser based on the estimated available DC power, the number of available electrolysers, and the voltage of each electrolyser. DC current supplied by at least one DC-DC power converter to each electrolyser is controlled to bring the DC current to the target current set point. The method is periodically repeated to compensate for changes in the DC power available from the wind farm.

20 Claims, 6 Drawing Sheets

U.S. PATENT DOCUMENTS

| | | | |
|---|---|---|---|
| 2005/0044853 A1* | 3/2005 | Yoshino | 60/641.8 |
| 2005/0121334 A1* | 6/2005 | Sumita | 205/628 |
| 2005/0165511 A1* | 7/2005 | Fairlie | 700/286 |
| 2006/0065302 A1* | 3/2006 | Gibson et al. | 136/291 |
| 2006/0208571 A1* | 9/2006 | Fairlie | 307/11 |
| 2007/0001461 A1* | 1/2007 | Hopewell | 290/44 |
| 2007/0246943 A1 | 10/2007 | Chang et al. | |
| 2008/0047502 A1* | 2/2008 | Morse | 123/3 |
| 2008/0121525 A1* | 5/2008 | Doland | 204/661 |
| 2008/0127646 A1* | 6/2008 | Doland | 60/641.2 |

* cited by examiner

POWER DISPATCH SYSTEM FOR ELECTROLYTIC PRODUCTION OF HYDROGEN FROM WIND POWER

CROSS-REFERENCE TO RELATED APPLICATIONS

This application claims the benefit and priority of U.S. Provisional No. 61/193,124 filed Oct. 30, 2008. The entire disclosure of the above application is incorporated herein by reference.

FIELD OF THE INVENTION

The present invention relates to the distribution of wind generated electricity to electrolyser modules for the production of hydrogen gas.

BACKGROUND OF THE INVENTION

Hydrogen is an important industrial gas, widely used in oil refining, and production of synthetic fuels, ammonia, and methanol. Hydrogen also is being considered for future use in hydrogen vehicles powered by hydrogen fuel cell engines or hydrogen internal combustion engines (or hybrid hydrogen vehicles, also partially powered by batteries). Most of the current supply of hydrogen is produced by steam methane reforming, using natural gas feedstock. With finite supplies of fossil-based energy resources such as natural gas and increasing prices of these energy resources, as well as the possibility of the imposition of carbon emission taxes, the cost, and eventually the availability, of hydrogen will be adversely affected unless an alternative clean and sustainable "feedstock" can be implemented.

Wind resources represent a potential source of large amounts of sustainable and clean energy. With recent increases in the cost of natural gas, the concept of using wind turbine generators in "wind farms" to supply sustainable, clean and relatively low cost electrical power to electrolysers for large scale production of "green" hydrogen is becoming an economically viable approach.

Electrolysers use DC electricity to transform reactant chemicals to desired product chemicals through electrochemical reactions, i.e., reactions that occur at electrodes that are in contact with an electrolyte. Electrolysers that can produce hydrogen include: water electrolysers, which produce hydrogen and oxygen from water and electricity; ammonia electrolysers, which produce hydrogen and nitrogen from ammonia and electricity; and, chlor-alkali electrolysers, which produce hydrogen, chlorine and caustic solution from brine and electricity.

Water electrolysers are the most common type of electrolyser used to produce gaseous hydrogen. Oxygen also is an important industrial gas, and the oxygen generated may be a saleable product. The most common type of commercial water electrolyser currently is the alkaline water electrolyser. Other types of water electrolysers include PEM water electrolysers, currently limited to relatively small production capacities, and solid oxide water electrolysers, which have not been commercialized. Alkaline water electrolysers utilize an alkaline electrolyte in contact with appropriately catalyzed electrodes. Hydrogen is produced at the surfaces of the cathodes (negative electrodes), and oxygen is produced at the surfaces of the anodes (positive electrodes) upon passage of current between the electrodes. The rates of production of hydrogen and oxygen are proportional to the DC current flow in the absence of parasitic reactions and stray currents, and for a given physical size of electrolyser.

Wind farms consist of a number of wind turbine generators, generally spread over a significant geographical area. Wind farms typically generate AC electricity for delivery to an AC utility grid, although generation of DC power also is possible. AC electricity can easily be transformed to higher voltages for efficient transmission of high power over long distances. Wind farm total output can range from tens of MW to hundreds of MW. The electrolyser module size could range from below 1 MW up to 5 MW. Dedicated hydrogen generation using electrolyser modules as loads connected to a large wind farm will therefore employ a significant number of electrolyser modules.

Large scale, low cost production of "wind hydrogen" (hydrogen produced by water electrolysis using wind power) requires capture of a high percentage of the wind power generated, the output of which is variable over time. This requirement necessitates firstly the use of multiple large scale, low cost water electrolyser modules that can act as highly variable loads to cover a wide range of operating power, from low to very high power densities. An appropriate water electrolyser module design is disclosed in the co-pending application which is incorporated by reference herein in its entirety. Other necessary elements are an efficient, low cost, and flexible electrical power dispatch system and operating method to distribute the wind power to the multiple water electrolyser modules, as well as effective control of the electrolyser modules to ensure load matching to the wind farm output. An appropriate electrical power dispatch system and operating and control methods are described herein. Although the description of the invention herein relates to "wind hydrogen", it is to be understood that the invention also is applicable to electrolytic production of other chemicals, for example, direct production of "wind ammonia" using the electrolyser described in US 2008/0193360.

PRIOR ART

Commercial electrolyser systems for industrial applications currently typically utilize power supplies, for example, SCR rectifiers, which convert AC electricity to regulated DC electricity of the desired power level and current-voltage. However, the best efficiency and power factor of SCR rectifiers is at the nominal power rating; both the efficiency and power factor drop significantly as the power level is turned down, as is frequently the case for wind powered electrolyser systems. Since all of the power fed to the electrolyser modules must pass through the power dispatch system, the potential effects of SCR rectifier inefficiency are substantial. Furthermore, harmonics levels typically may not meet IEEE 519 guidelines, although they are improved through the use of 12 pulse configurations; this is of concern for large systems. The use of SCR rectifiers also necessitates two transformer stages to step down the voltage from high voltage AC transmission lines.

Pritchard (U.S. Pat. No. 5,592,028) describes an alternative electrical power regulation apparatus for a wind hydrogen system that targets operation of water electrolyser modules at cell voltages of about 1.6 V, by using switches to vary the number of cells engaged in each of the electrolyser modules. This apparatus focuses on achieving high electrolyser module operating voltage efficiency. The corresponding operating current density will necessarily be low for any given cell configuration and set of components. Consequently, in order to capture a high percentage of wind power generated by a wind farm, the number and/or physical size of electrolyser modules will be inordinately large, and the associated capital cost will be relatively high. Notably, a key factor for low cost production of wind hydrogen is availability of low cost wind power (i.e., high wind capacity factors); this, combined with the significant thermodynamic (i.e., minimum) voltage requirement for water electrolysis, limits potential cost benefits associated with targeting high electrolyser module operating efficiency. Pritchard does not provide any details of the rest of the corresponding power dispatch system or its control, other than the use of an AC-DC converter/filter upstream of the switch apparatus.

Morse (US 2008/0047502) also briefly describes a similar electrical power conversion apparatus as part of a wind hydrogen system. The unit load can be varied to assure maximum electrolyser module efficiency, for example, by adjusting the number of active cells. Morse also teaches that in general AC electricity generated at a wind farm may be stepped up to high voltage and transmitted to a point of use, then stepped down and converted to DC electricity by a full bridge rectifier or equivalent, but provides no further details in this regard.

Doland (US 2008/0127646) describes a system that simultaneously controls and adjusts both the electrical power output from a wind farm and electrical power conversion to the requirements of the electrolyser modules. Doland generally mentions functional requirements such as maximizing the hydrogen produced and minimizing energy losses, but does not describe details of how these requirements are to be achieved.

SUMMARY OF THE INVENTION

A system for distributing electric power from a wind farm generating medium to high voltage AC electricity to multiple electrolyser modules for producing hydrogen comprising:
a. power determination and monitoring means for one or more of measuring, estimating and predicting the power of the AC electricity generated by the wind farm;
b. transmission lines connected to the wind farm for transmitting the medium to high voltage AC electricity from the wind farm to the vicinity of the multiple electrolyser modules;
c. one or more step down n-pulse transformers located proximate to the multiple electrolyser modules for receiving the medium to high voltage AC electricity from the transmission lines and transforming it to low voltage AC electricity;
d. one or more non-regulated n-pulse rectifiers for receiving the low voltage AC electricity from the step down transformer and converting it to non-regulated low voltage DC electricity;
e. one or more n-pulse DC buses connected to the one or more non-regulated n-pulse rectifiers for receiving and distributing the non-regulated low voltage DC electricity;
f. one or more regulated n-pulse DC-DC converters associated with each of the multiple electrolyser modules, each of the regulated n-pulse DC-DC converters connected to at least one of the one or more n-pulse DC buses, for receiving the non-regulated low voltage DC electricity from at least one of the one or more n-pulse DC buses and supplying regulated DC electricity to each of the multiple electrolyser modules;
g. one or more electrolyser module controllers connected to the plurality of electrolyser modules for controlling the plurality of electrolyser modules;
h. one or more dispatch controllers connected to the power determination and monitoring means and the one or more electrolyser module controllers for monitoring the power determination and monitoring means and the one or more electrolyser module controller and for controlling the system for distributing electric power;
i. one or more alternative loads connected to one or more of the transmission lines, the low voltage side of the one or more central step down n-pulse transformers, and for demanding any of the electric power from the wind farm that is not demanded by the multiple electrolyser modules;
j. one or more alternative power sources connected to at least one of the high voltage side and the low voltage side of the one or more central step down n-pulse transformer, and said at least one n-pulse DC bus, for supplying any electric power demanded by the multiple electrolyser modules that is not supplied by the wind farm.
where n-pulse is one of 6-pulse, 12-pulse, and 24-pulse.

A system for distributing electric power from a wind farm generating medium voltage DC electricity to multiple electrolyser modules for producing hydrogen comprising:
a. power determination and monitoring means for at least one of measuring, estimating and predicting the power of the DC electricity generated by the wind farm;
b. transmission lines connected to the wind farm for transmitting the medium voltage DC electricity from the wind farm to the vicinity of the multiple electrolyser modules;
c. one or more step down converters located proximate to the multiple electrolyser modules for receiving the medium voltage DC electricity from the transmission lines and converting it to non-regulated low voltage DC electricity;
d. one or more DC buses connected to the one or more step down converters for receiving and distributing the low voltage DC electricity;
e. one or more regulated DC-DC converters associated with each of the multiple electrolyser modules and connected to at least one of the one or more DC buses, for receiving the non-regulated low voltage DC electricity from the one or more DC buses and supplying regulated DC electricity to each of the multiple electrolyser modules;
f. one or more electrolyser module controllers connected to the plurality of electrolyser modules for controlling the plurality of electrolyser modules;
g. one or more dispatch controllers connected to the power determination and monitoring means and the electrolyser module controllers for monitoring said power determination and monitoring means and the one or more electrolyser module controllers and for controlling the system for distributing electric power;
h. one or more alternative loads connecting one or more of the transmission lines, the low voltage side of the one or more step down converters, and the one or more DC buses for demanding any of the electric power from the wind farm that is not demanded by the multiple electrolyser modules;
i. one or more alternative power sources connected to one or more of the medium voltage side and the low voltage side of the one or more step down converter, and the one or more DC buses, for supplying any electric power demanded by the multiple electrolyser modules that is not supplied by the wind farm.

A method for distributing electric power from a wind farm generating medium to high voltage AC electricity to multiple electrolyser modules for producing hydrogen comprising the steps of:
a. at least one of measuring, estimating and predicting the power of the AC electricity generated by the wind farm;
b. estimating power transmission and distribution losses;
c. transmitting the medium to high voltage AC electricity to the vicinity of the multiple electrolyser modules;
d. transforming the AC electricity to low voltage AC electricity using at one or more step down n-pulse transformers;

e. converting the low voltage AC electricity to non-regulated low voltage DC electricity using one or more non-regulated n-pulse rectifiers;

f. distributing the non-regulated low voltage DC electricity via one or more n-pulse DC buses;

g. receiving and regulating the non-regulated low voltage DC electricity using one or more regulated n-pulse DC-DC converters associated with each of the multiple electrolyser modules and connected to at least one of the one or more n-pulse DC buses, and supplying regulated DC electricity to each of the multiple electrolyser modules according to the at least one of measured, estimated and predicted power of the medium to high voltage AC electricity generated by the wind farm and estimated power transmission and conversion losses;

h. directing any power generated by the wind farm that is not demanded by the multiple electrolyser modules to one or more alternative loads;

i. supplying any electric power demanded by the multiple electrolyser modules that is not supplied by the wind farm from one or more alternative power sources.

where n-pulse is one of 6-pulse, 12-pulse, and 24-pulse.

A method for distributing electric power from a wind farm generating medium voltage DC electricity to multiple electrolyser modules for producing hydrogen comprising the steps of:

a. at least one of measuring, estimating and predicting the power of the DC electricity generated by the wind farm;

b. estimating power transmission and distribution losses;

c. transmitting the medium voltage DC electricity to the vicinity of the multiple electrolyser modules;

d. converting the medium voltage DC electricity to non-regulated low voltage DC electricity using one or more step down converters;

e. distributing the non-regulated low voltage DC electricity via one or more DC buses;

f. receiving and regulating the non-regulated low voltage DC electricity using one or more regulated DC-DC converters associated with each of the multiple electrolyser modules and connected to one or more of the one or more DC buses, and supplying regulated DC electricity to each of the multiple electrolyser modules according to at least one of measured, estimated and predicted power of the medium voltage DC electricity generated by the wind farm and estimated power transmission and conversion losses;

g. directing any power generated by the wind farm that is not demanded by the plurality of electrolyser modules to one or more alternative loads;

h. supplying any electric power demanded by the multiple electrolyser modules that is not supplied by the wind farm from one or more alternative power sources.

A method for controlling the distribution of electric power from a wind farm generating at least one of medium to high voltage AC electricity and medium voltage DC electricity to multiple electrolyser modules for producing hydrogen, comprising the steps of:

a. estimating the real time wind farm power available as DC at the electrolyzer terminals;

b. determining the number of available electrolyser modules;

c. measuring the temperature of each electrolyser module;

d. determining a target current set point for each of the multiple electrolyser modules based on the estimated available DC power, the number of available electrolyser modules, and the temperature of each of the available electrolyser modules;

e. ramping the DC current supplied by one or more DC-DC power converters to each of the available electrolyser modules toward the target current set point;

f. repeating steps a to e at appropriate time intervals.

DETAILED DESCRIPTION OF PREFERRED EMBODIMENTS

System for Distributing AC Electric Power

Figure 1:
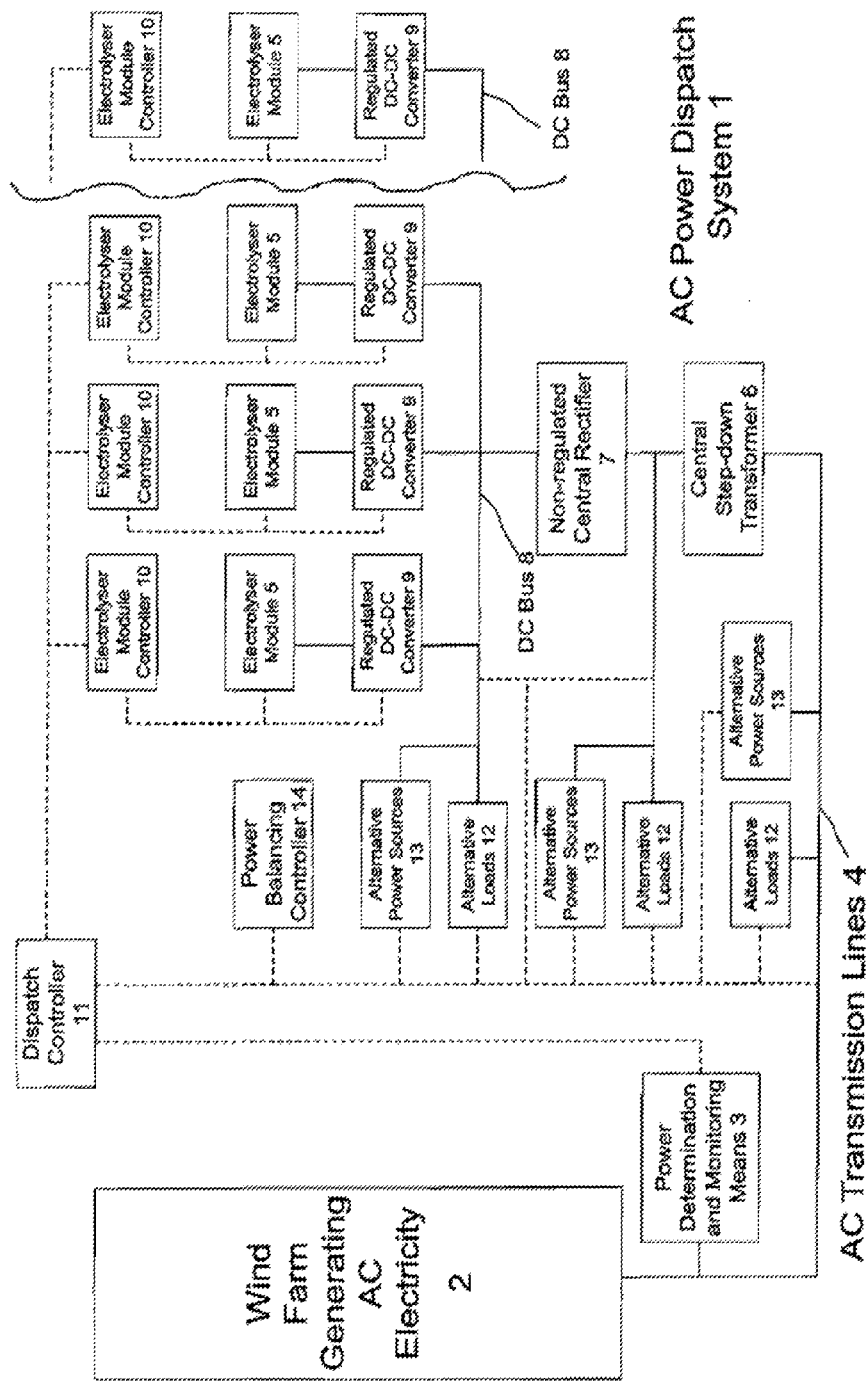
FIG. 1 shows a system for distributing AC electric power generated by a wind farm to multiple electrolyser modules in accordance with the present invention. Dashed lines indicate control signal carrying connections; solid lines indicate power carrying connections.

A system for distributing AC electric power generated by a wind farm to a plurality of electrolyser modules for producing hydrogen in accordance with the present invention is shown generally at 1 in FIG. 1. Dashed lines indicate control signal carrying connections; solid lines indicate power carrying connections. A wind farm 2, with one or more wind turbine generators, generates medium to high voltage AC electricity. One or more power determination and monitoring means 3 are located in or proximate to the wind farm for measuring and/or enabling estimation of and/or enabling prediction of the power of the AC electricity generated by the wind farm. Transmission lines 4 efficiently transmit the medium to high voltage AC electricity from the wind farm 2 to centralized transformation and rectification equipment located in the vicinity of the plurality of an electrolyser modules 5. There, one or more central step down n-pulse transformers 6 transform the medium to high voltage AC electricity to low voltage AC electricity. One or more central non-regulated n-pulse rectifiers 7 then convert the low voltage AC electricity from the step down n-pulse transformer to non-regulated low voltage DC electricity. One or more n-pulse DC buses 8 then distribute the non-regulated low voltage DC electricity to regulated n-pulse DC-DC converters 9; one or more n-pulse DC-DC converters are used for each of the electrolyser modules 5. The n-pulse DC-DC converters 9 convert the non-regulated low voltage DC electricity to regulated DC electricity of the current-voltage ratio required at any given time by each of the corresponding electrolyser modules 5. The electrolyser modules 5 utilize the regulated DC electricity to produce hydrogen gas, and in the case of water electrolysis, oxygen gas.

The AC power dispatch system 1 further comprises one or more electrolyser module controllers 10 that are connected to the electrolyser modules 5 and the n-pulse DC-DC converters 9 for controlling the electrolyser modules, and at least one dispatch controller 11 that is connected to the one or more power determination and monitoring means 3 and the at least one electrolyser module controller 10 for implementing system control as described herein. Preferably, but not necessarily, there is one electrolyser module controller 10 for each of the electrolyser modules 5 and its associated one or more DC-DC converters.

The AC power dispatch system 1 further comprises means for dealing with a power imbalance between the primary power sources (the wind farm) and primary power sinks (the electrolyser modules), involving a system of one or more alternative loads 12 for demanding any of the electric power generated by the wind farm 2 that is not demanded by the electrolyser modules 5, one or more alternative power sources 13 for supplying any electric power demanded by the electrolyser modules 5 that is not supplied by the wind farm 2, and one or more fast acting power balancing controllers 14 that appropriately activate the one or more alternative loads and the one or more alternative power sources so as to balance the power (and reactive power for an AC grid) and thus maintain stable voltage (and stable frequency for an AC grid). The one or more power balancing controllers 14 are connected to the one or more alternative loads 12 and the one or more alternative power sources 13, as well as optionally the AC transmission lines 4, the one or more n-pulse DC buses 8, and the at least one dispatch controller 11. In the case of interconnection to a relatively large utility electrical grid, the functions of alternative loads, alternative power sources and power balancing controllers are "automatically" carried out by the capacity of the large utility electrical grid to absorb and deliver sufficient levels of power on demand. Alternative loads, alternative power sources and power balancing controllers are required on weak electrical grids that do not have sufficient on-demand power supply and absorbing capabilities to maintain stability when power imbalances occur.

Details of the AC power dispatch system 1 are described below.

The n-pulse equipment in any given system can be one of 6-pulse, 12-pulse, or 24-pulse; each 12-pulse or 24-pulse non-regulated rectifier, DC-bus, or DC-DC converter generally consists of two 6-pulse units, or four 6-pulse units, respectively. 12-pulse or 24-pulse configurations are preferred for use in MW-scale applications for greatly reduced harmonics and higher power factor versus 6-pulse configurations.

The power pathway in accordance with the present invention splits the functionality of the power supplies (for example, SCR rectifiers) in a conventional power pathway into two discrete functions; AC-DC power conversion and DC power regulation (DC-DC power conversion). Separation of the two functionalities enables "centralization" of the AC-DC power conversion equipment, that is, use of a single larger and more cost effective AC-DC power converter. Non limiting examples of suitable hardware are diode rectifiers for AC-DC power conversion (i.e., the one or more central non-regulated n-pulse rectifiers 7), and choppers for DC power regulation (i.e., the one or more n-pulse DC-DC converters 9 used for each of the electrolyser modules 5); 12-pulse or 24 pulse equipment and connecting buses are preferred for MW-scale power systems. Since SCR rectifiers are not used, the one or more central step down n-pulse transformers 6 can be single stage transformers.

The combination of non-regulated diode rectifiers 7 and regulated DC-DC converters 9 provides advantages versus SCR rectifiers such as good efficiency over a wide range of operating power ("flat efficiency"), good power factor and low harmonics. These characteristics also allow for use of a more conventional transformer and with more effective and efficient single stage step down from high voltage. Although SCR rectifiers have better efficiency near rated output compared with other power supplies that have more than one conversion stage, at lower power outputs the harmonics generated by slicing up of the AC waveform causes heating and losses in the transformer. The use of 12-pulse or 24-pulse diode rectifiers and downstream DC buses is preferred for MW-scale power systems.

Chopper type DC to DC converters can be used as the one or more DC-DC converters 9 to provide regulated DC electricity of the required voltage and current to the multiple electrolyser modules 5. In the case of a 12-pulse configuration, which is preferred for MW-scale applications, at least one 12-pulse chopper (consisting of two 6-pulse choppers) is required for each electrolyser cell module for independent power control. Use of the same DC-DC power converter 9 to feed power to multiple electrolyser modules 5 can be considered, provided that the possibility of uneven current sharing between the multiple electrolyser modules can be tolerated.

The at least one dispatch controller 11 may be a PLC or similar device. The robustness and responsiveness of PLC's makes them well suited to this application. The at least one dispatch controller monitors the one or more electrolyser module controllers 10, which may also be PLC's or similar devices, for data, alarms and faults; it also monitors the one or more power determination and monitoring means 3 to acquire real time or predicted wind power data. In addition to direct power measurements, other approaches to estimating or predicting wind power as are known in the art also can be used. For example, wind power or wind speed can be measured at each wind turbine and the multiple measurements can be used to provide total estimated real time or predicted wind power for the wind farm. The at least one dispatch controller uses the acquired data to control the power dispatch system by implementing the control strategy described herein. The at least one dispatch controller may have a redundant processor for fail-safe operation and may communicate with the one or more electrolyser module controllers and with the one or more power determination and monitoring means over a redundant communications network.

One electrolyser module controller 10 per electrolyser module 5 is shown in FIG. 1 as a preferred, but not necessarily required approach. The electrolyser module controllers monitor and control all the functions of the electrolyser modules and the DC-DC converters 9. In addition to the standard controller function, a separate safety critical relay system may also be used to monitor safety critical conditions that would warrant shutdown of the cell module and its power supply during out of bounds operation. This separate safety system ensures reliable shutdown should the controllers fail.

The one or more alternative power sources 13 may include but are not limited to a utility electrical grid, a local electrical grid, power generator sets, or energy storage and electricity regeneration equipment such as flywheel, batteries (including redox flow batteries) and compressed air energy systems. The one or more alternative power sources 13 may be connected to one or more of the medium to high voltage or low voltage sides of the one or more central step down transformers 6, or to the one or more DC buses 8. The one or more alternative power sources 13 may include but are not limited to a utility electrical grid, a local electrical grid, power generator sets, or energy storage and electricity regeneration equipment such as flywheels, batteries (including redox flow batteries) and compressed air energy systems. In cases in which the wind-hydrogen system is providing hydrogen to an associated hydrogen user such as a chemical plant or refinery, the associated hydrogen user may provide some or all of the required alternative loads and alternative power sources.

The one or more alternative loads 12 may include but are not limited to a utility electrical grid, a local electrical grid, dump resistive loads, or energy storage and electricity regeneration equipment such as flywheels, batteries (including redox flow batteries) and compressed air energy systems. The one or more alternative loads 12 may be connected to one or more of the transmission lines 4, the low voltage side of the one or more central step down n-pulse transformers 6, and the one or more n-pulse DC buses 8. The one or more alternative power sources 13 may include but are not limited to a utility electrical grid, a local electrical grid, power generator sets, or energy storage and electricity regeneration equipment such as flywheels, batteries (including redox flow batteries) and compressed air energy systems. In cases in which the wind-hydrogen system is providing hydrogen to an associated hydrogen user such as a chemical plant or refinery, the associated hydrogen user may provide some or all of the required alternative loads and alternative power sources.

Alternative loads 12 and alternative power sources 13 may be one or more of medium to high voltage AC, low voltage AC, or DC. In the case of 12-pulse and 24-pulse equipment, any alternative loads and/or alternative power sources connected to the low voltage side of the one or more central step down n-pulse transformers 6 or the DC buses must be balanced for each of the two sides for 12-pulse configurations, and each of the four sides for 24-pulse configurations. DC loads and power sources might have faster response if AC loads and power sources must be synchronized to an electrical grid.

Normal wind excursions such as sudden drops in wind power or sudden loss of a single wind turbine generator in a relatively large wind farm (nominal wind power of, for example, 50 MW or more) will perturb the wind hydrogen system 1 and will require the employment of one or more alternative power sources 13 to make up the short-term power difference between the power demanded by the electrolyser modules 5 and the power supplied by the wind farm 2. The magnitude and duration of the power difference will depend on the magnitude and duration of the wind power loss and the time delay between wind power measurement and current control to the electrolyser modules. The time delay between power measurement and current control preferably is less than one second.

However, large power differences that would occur from the sudden shutdown of large numbers of wind turbine generators, such as during a power grid fault, would necessitate alternative power sources 13 of high rating approaching that of the total wind farm rating. This clearly is not a desirable or practical solution. Therefore, for sudden large wind power losses another means must be available to quickly bring the electrolyzer modules off line. In the most basic case of the entire wind farm shutting down at once, either a shutdown signal from the wind farm 2, the one or more power determination and monitoring means 3, or a power loss detection relay can be used to send a shutdown signal to the electrolyzer plant. This capability also could be implemented through the dispatch controller 11 if the controller is fast enough; however, in general, implementation through a faster means such as through a hardwire circuit or as part of the power balancing controller 14 function is preferred.

If only parts of the wind farm shut down at once leaving a significant power source still active, then only an equivalent part of the electrolyzer plant can be shut down or "shed". This capability requires a special design as part of the power balancing controller to properly maintain the power balance either through bringing on power sources or shedding loads such as the electrolyzer modules.

Sudden wind gusts of large magnitude also can imbalance the power dispatch system, sometimes up to the rating of the wind farm. The imbalance will be maintained as long as the electrolyzer modules power ramp rate cannot keep up with the wind power ramp rate. The switching on of any non-operating electrolyzer modules to keep up with this rise in wind power will only increase the time to regain power balance. An appropriately sized large alternative load, although required for very short periods of time, may be unsuitable with respect to size and cost. Modern wind turbine generators provide the means to curtail (reduce) their output automatically or on demand, and this feature may well be required for weak grids in order to avoid a requirement for very large alternative loads. Modern wind speed prediction algorithms used in wind turbine generator controls may also help to provide highly responsive curtailing of wind turbine generator power.

Wind power gusts are not the only potential source of power imbalances on the grid. The close tracking of wind power by the electrolyser modules requires accurate and timely wind power determinations (measurements/estimates/predictions) to be translated into accurate power settings for the electrolyser modules. In practice, some errors in the power measurements may occur through calibration errors in instruments and inaccuracy in estimating losses/conversions between the point of wind power measurement and the electrolyser modules DC bus. Also, time delay between measuring/estimating/predicting wind power and electrolyser modules current control will add to this error. These errors will be translated into power imbalances on a weak grid that must be corrected through the alternative load and alternative power source control system.

Error mitigation approaches can potentially reduce these errors and lower the ratings and costs of the alternative loads and sources. One error mitigation approach is to utilize power imbalance readings determined by the power balancing controller and feed this information back to the dispatch controller so that it can adjust the power settings to the electrolyser modules. The power balancing controller must have the capability to translate frequency (in the case of AC grid) or voltage (in the case of DC grid) excursions into power imbalance levels (positive for excess power on the grid and negative for excess draw on the grid).

One potential implementation of this error mitigation approach is to set a threshold power level, and whenever the power balancing controller measures an imbalance on the grid above this threshold level, it sends an interrupt signal to the dispatch controller to adjust the power levels to the electrolyser modules by the threshold power level in the direction to correct the imbalance, as long as the electrolyser module current rating and maximum ramp rate are maintained. The optimum threshold power level can be determined through computer simulation. This method does not require an accurate determination of the power imbalance level. Computer simulation results from such a "step type error mitigation" method are shown in the Examples below.

Another potential implementation of the error mitigation approach is to continuously determine the actual power imbalance (either positive or negative) on the grid and feed these data to the dispatch controller so it can adjust the power settings to the electrolyser modules proportionately. This potential implementation requires accurate power imbalance determinations; otherwise, its own introduction of error into the control strategy will not provide any improvement.

If an error mitigation method is employed, then the power balancing controller 14 will send a signal to the dispatch controller 11. In the case of a step type error mitigation method, a digital signal is sent to the dispatch controller when a threshold power setting is exceeded in either positive or negative power imbalance. In the case of the continuous error mitigation method, an analog signal proportional to the positive or negative power imbalance is sent to the dispatch controller.

In the case of interconnection to a relatively large utility electrical grid, the functions of alternative loads and alternative power sources are "automatically" carried out by the capacity of the large utility electrical grid to absorb and deliver sufficient levels of power on demand. At the opposite extreme, in the case where the wind-hydrogen system is a stand-alone system, active power management as is known in the art is required to control and appropriately utilize the required level of alternative loads or alternative power sources to correct any power imbalance. The power balancing controller 14 for active power management must be fast and dynamic with millisecond response and means to measure frequency and voltage variance. In the case of remote utility electrical grids, the remote utility electrical grid may "automatically" provide some of the functions of alternative loads and alternative power sources, and the remote utility electrical grid may have an active power management system.

Thus, distribution of electric power from a wind farm for generating medium to high voltage AC electricity to multiple electrolyser modules for producing hydrogen generally involves the following steps: (a) estimating in real time and/or predicting the power of the AC electricity generated by the wind farm; (b) transmitting medium to high voltage AC electricity to the multiple electrolyser modules; (c) transforming the medium to high voltage AC electricity to low voltage AC electricity using one or more step down transformers; (d) converting the low voltage AC electricity to non-regulated low voltage DC electricity using one or more non-regulated rectifiers; (e) distributing the non-regulated low voltage DC electricity via one or more DC buses; (f) receiving and regulating the non-regulated low voltage DC electricity using one or more regulated DC-DC converters associated with each of the multiple electrolyser modules and connected to at least one of the one or more DC buses, and supplying regulated DC electricity to each of the multiple electrolyser modules according to the measured power of the AC electricity generated by the wind farm and estimated power transmission and conversion losses; (g) directing any power generated by the wind farm that is not demanded by the multiple electrolyser modules to one or more alternative loads; and, (h) supplying any electric power demanded by the multiple electrolyser modules that is not supplied by the wind farm from one or more alternative power sources.

System for Distributing DC Electric Power

Figure 2:
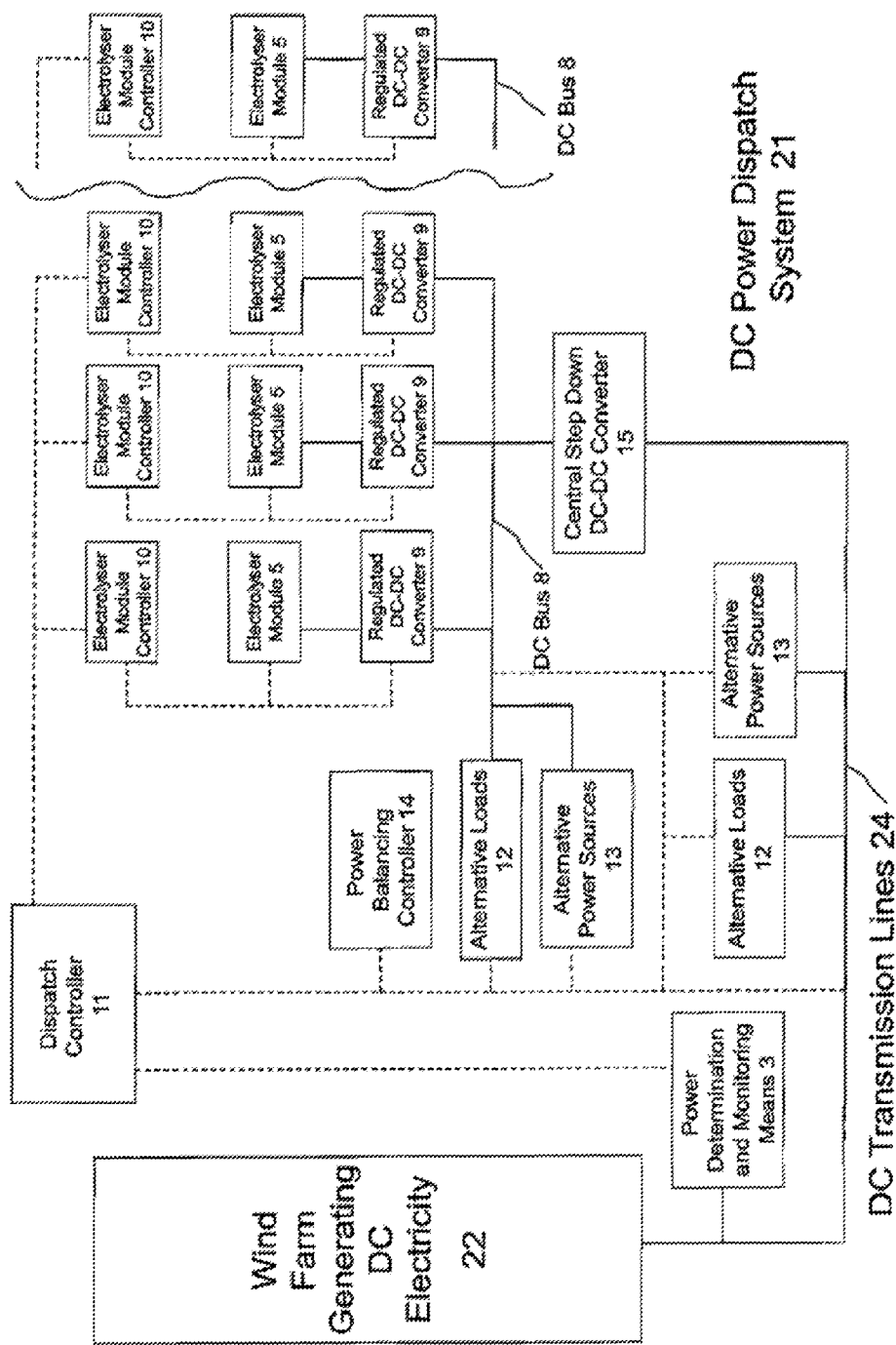
FIG. 2 shows a system for distributing DC electric power generated by a wind farm to multiple electrolyser modules in accordance with the present invention. Dashed lines indicate control signal carrying connections; solid lines indicate power carrying connections.

A system for distributing DC electric power generated by a wind farm to a plurality of electrolyser modules for producing hydrogen in accordance with the present invention is shown generally at 21 in FIG. 2. Dashed lines indicate control signal carrying connections; solid lines indicate power carrying connections. The wind farm 22, with one or more wind turbine generators, generates medium voltage DC electricity. One or more power determination and monitoring means 3 are located in or proximate to the wind farm for measuring and/or enabling estimation of and/or enabling prediction of the power of the medium voltage DC electricity. The DC transmission lines 24 efficiently transmit the medium voltage DC electricity from the wind farm to the vicinity of the plurality of the electrolyser modules 5. There, one or more central step down DC-DC converters 15 convert the medium voltage DC electricity to low voltage DC electricity. One or more DC buses 8 then distribute the non-regulated low voltage DC electricity to regulated DC-DC converters 9; one or more DC-DC converters are used for each of the electrolyser modules 5. The DC-DC converters 9 convert the non-regulated low voltage DC electricity to regulated DC electricity of the voltage-current ratio required at any given time by each of the corresponding electrolyser modules. The electrolyser modules 5 utilize the regulated DC electricity to produce hydrogen gas, and in the case of water electrolysis, oxygen gas.

The DC power dispatch system 21 further comprises one or more electrolyser module controllers 10 that are connected to the electrolyser modules 5 and the respective DC-DC converters 9 for controlling the electrolyser modules, and at least one dispatch controller 11 that is connected to the power determination and monitoring means 3 and the electrolyser module controllers 10 for implementing system control as described herein.

The DC power dispatch system 21 further comprises means for dealing with power imbalance between the primary power sources (the wind farm) and primary power sinks (the electrolyser modules) involving a system of one or more alternative loads 12 for demanding any of the electric power generated by the wind farm 22 that is not demanded by the electrolyser modules 5, or one or more alternative power sources 13 for supplying any electric power demanded by the electrolyser modules 5 that is not supplied by the wind farm 2, and one or more fast acting power balancing controllers 14 that appropriately activate the one or more alternative loads and the one or more alternative power sources to balance the power and thus maintain stable voltage. The one or more power balancing controllers 14 are connected to the one or more alternative loads 12 and the one or more alternative power sources 13, as well as optionally the transmission lines 24, and the at least one dispatch controller 11. In the case of interconnection of a medium voltage DC transmission line to a relatively large utility electrical grid, the functions of alternative loads and alternative power sources are "automatically" carried out by the capacity of the large utility electrical grid to absorb and deliver sufficient levels of power on demand. Alternative loads, alternative power supplies and power balancing controllers are required on weak electrical grids that do not have sufficient on-demand power supply and absorbing capabilities to maintain stability when power imbalances occur.

Details of the DC power dispatch system 21 are described below.

Wind turbine generators producing DC power, although currently less common than those producing AC power, are commercially available. The individual DC wind turbine generators typically each have a rectifier that delivers low voltage DC power to a DC-DC boost converter. The boost converter boosts the voltage from low to medium level. The boost converters for individual wind turbine generators feed into a common medium voltage DC transmission line. The DC transmission line can be buried and routed to the electrolyser modules. At the electrolyser modules location, the one or more central DC-DC converters 15 may be, but are not limited to, buck converters that bring the voltage back down to a low voltage on a common DC bus. The one or more regulated DC-DC converters 9 may be, but are not limited to, individual chopper power supplies that deliver regulated DC electricity from the DC bus to each of the electrolyser modules 5. At least one DC-DC converter is required for each electrolyser cell module for independent power control. Use of the same DC-DC power converter 9 to feed power to multiple electrolyser modules 5 can be considered, provided that the possibility of uneven current sharing can be tolerated.

The dispatch controller 11 may be a PLC or a similar device. The robustness and responsiveness of PLC's makes them well suited to this application. The dispatch controller monitors the electrolyser modules controllers 10, which may also be PLC's or similar devices, for data, alarms and faults; it also monitors the one or more power determination and monitoring means 3 to acquire real time or predicted wind power data. In addition to direct power measurements, other approaches to estimating or predicting wind power as are known in the art also can be used. For example, wind power or wind speed can be measured at each wind turbine and the multiple measurements can be used to provide total estimated real time or predicted wind power for the wind farm. The dispatch controller uses the acquired data to control the power dispatch system by implementing the control strategy described herein. The dispatch controller may have a redundant processor for fail-safe operation and may communicate with the electrolyser module controllers and with the power determination and monitoring means over a redundant communications network.

One electrolyser module controller 10 per electrolyser module 5 is shown in FIG. 2 as a preferred, but not necessarily required approach. The electrolyser module controllers control all the functions of the electrolyser modules and the DC-DC converters 8. In addition to the standard controller function, a separate safety critical relay system may also be used to monitor safety critical conditions that would warrant shutdown of the cell module and its power supply during out of bounds operation. This separate safety system ensures reliable shutdown should the controllers fail.

The one or more alternative loads 12 may include but are not limited to a utility electrical grid, a local electrical grid, dump resistive loads, or energy storage and electricity regeneration equipment such as flywheels, batteries (including redox flow batteries) and compressed air energy systems. The one or more alternative loads 12 may be connected to one or more of the DC transmission lines 24, the low voltage side of the one or more central step down DC-DC converters 15, and the one or more DC buses 8. The one or more alternative power sources 13 may include but are limited to a utility electrical grid, a local electrical grid, power generator sets, or energy storage and electricity regeneration equipment such as flywheels, batteries (including redox flow batteries) and compressed air energy systems. The one or more alternative power sources 13 may be connected to one or more of the medium voltage or low voltage sides of the one or more central step down DC-DC converters 15, or to the one or more DC buses 8. The one or more alternative power sources 13 may include but are not limited to a utility electrical grid, a local electrical grid, power generator sets, or energy storage and electricity regeneration equipment such as flywheels, batteries (including redox flow batteries) and compressed air energy systems. In cases in which the wind-hydrogen system is providing hydrogen to an associated hydrogen user such as a chemical plant or refinery, the associated hydrogen user may provide some or all of the required alternative loads and alternative power sources.

Alternative loads 12 and alternative power sources 13 are DC, except in the case in which the alternative loads and alternative power sources are provided by an AC grid (utility grid or local grid).

Normal wind excursions such as sudden drops in wind power or sudden loss of a single wind turbine generator in a relatively large wind farm (nominal wind power of, for example, 50 MW or more) will perturb the wind hydrogen system 21 and require the employment of one or more alternative power sources 13 to make up the short-term power difference between the power demanded by the electrolyser modules 5 and the power supplied by the wind farm 22. The magnitude and duration of the power difference will depend on the magnitude and duration of the wind power loss and the time delay between wind power measurement and current control to the electrolyser modules. The time delay between power measurement and current control preferably is less than one second.

However, large power differences that would occur from the sudden shutdown of large numbers of wind turbine generators, such as during a power grid fault, would necessitate alternative power sources 13 of high rating approaching that of the total wind farm rating. This clearly is not a desirable or practical solution. Therefore, for sudden large wind power losses another means must be available to quickly bring the electrolyser modules off line. In the most basic case of the entire wind farm shutting down at once, either a shutdown signal from the wind farm 22, the one or more power and/or wind speed measuring and monitoring means 3, or a power loss detection relay can be used to send a shutdown signal to the electrolyser plant. This capability also could be implemented through the dispatch controller 11 if the controller is fast enough; however, in general implementation through a faster means such as through a hardwire circuit or as part of the power balancing controller 14 function is preferred.

If only parts of the wind farm shut down at once leaving a significant power source still active, then only an equivalent part of the electrolyser plant can be shut down or "shed". This capability requires a special design as part of the power balancing controller to properly maintain the power balance either through bringing on power sources or shedding loads such as the electrolyser modules.

Sudden wind gusts of large magnitude also can imbalance the power dispatch system, sometimes up to the rating of the wind farm. The imbalance will be maintained as long as the electrolyser modules power ramp rate cannot keep up with the wind power ramp rate. The switching on of any non-operating electrolyser modules to keep up with this rise in wind power will only increase the time to regain power balance. An appropriately sized large alternative load, although required for very short periods of time, may be unsuitable with respect to size and cost. Modern wind turbine generators provide the means to curtail (reduce) their output automatically or on demand, and this feature may well be required for weak grids in order to avoid a requirement for very large alternative loads. Modern wind speed prediction algorithms used in wind turbine generator controls may also help to provide highly responsive curtailing of wind turbine generator power.

If an error mitigation method is employed, then the power balancing controller 14 will send a signal to the dispatch controller 11. In the case of a step type error mitigation method, a digital signal is sent to the dispatch controller when a threshold power setting is exceeded in either positive or negative power imbalance. In the case of the continuous error mitigation method, an analog signal proportional to the positive or negative power imbalance is sent to the dispatch controller.

In the case of interconnection to a relatively large utility electrical grid, the functions of alternative loads and alternative power sources are "automatically" carried out by the capacity of the large utility electrical grid to absorb and deliver sufficient levels of power on demand. At the opposite extreme, in the case where the wind-hydrogen system is a stand-alone system, active power management as is known in the art is required to control and appropriately utilize the required level of alternative loads or alternative power sources to correct any power imbalance. The power balancing controller 14 for active power management must be fast and dynamic with millisecond response and means to measure voltage variance. In the case of interconnection to remote utility electrical grids, the remote utility electrical grid may "automatically" provide some of the functions of alternative loads and alternative power sources, and the remote utility electrical grid may have an active power management system.

Thus, distribution of electric power from a wind farm for generating medium voltage DC electricity to multiple electrolyser modules for producing hydrogen generally involves the following steps: (a) estimating in real time and/or predicting the power of the DC electricity generated by the wind farm; (b) transmitting the medium voltage DC electricity to the plurality of electrolyser modules; (c) converting the medium voltage DC electricity to non-regulated low voltage DC electricity using at least one step down converter; (d) distributing the non-regulated low voltage DC electricity via at least one DC bus; (e) receiving and regulating the non-regulated low voltage DC electricity using at least one regulated DC to DC converter associated with each of the plurality of electrolyser modules and connected to at least one of the at least one DC buses, and supplying regulated DC electricity to each of the multiple electrolyser modules according to the measured power of the DC electricity generated by the wind farm and estimated power transmission and conversion losses; (f) directing any electric power generated by the wind farm that is not demanded by the multiple electrolyser modules to one or more alternative loads; and, (g) supplying any electric power demanded by the multiple electrolyser modules that is not supplied by the wind farm from one or more alternative power sources.

Currently, AC transmission is preferred over DC transmission for use in the present invention based on efficiency, cost, reliability and proven technology. DC to DC power conversion and regulation technology will need to develop further to improve efficiency, costs and reliability before DC power transmission becomes a practical option. However, long transmission distance between the wind farm and the electrolyser modules could ultimately make DC power transmission more cost effective than AC transmission for transmission distances of 50 km or more.

Power Dispatch System Control and Load Matching to Wind Farm Power

Figure 3:
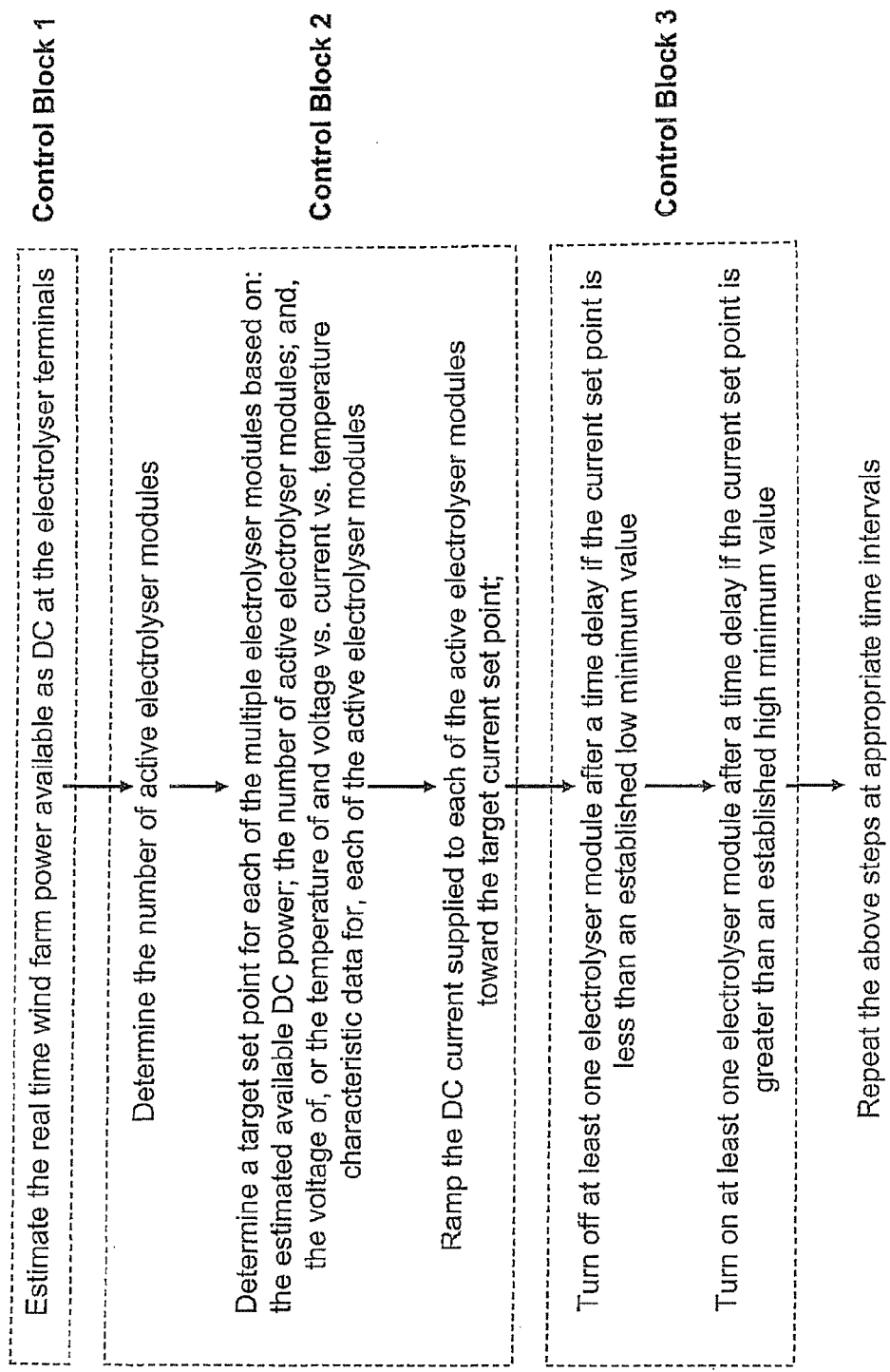
FIG. 3 shows the main control function steps for a system for distributing electric power generated by a wind farm to multiple electrolyser modules in accordance with the present invention.

A method for controlling the distribution of electric power from a wind farm for generating at least one of medium to high voltage AC electricity and medium voltage DC electricity to a plurality of electrolyser modules for producing hydrogen is outlined in FIG. 3. The control method consists of the steps of: (a) estimating the real time available DC power from the wind farm; (b) determining the number of active electrolyser modules (defined as electrolyser modules not under alarm or fault condition); (c) measuring the voltage of each electrolyser module; (d) determining the target current set point for each of said plurality of electrolyser modules based on the estimated available DC power from the wind farm, the number of active electrolyser modules, and the voltage of each of said active electrolyser modules; and, (e) ramping the DC current supplied by the DC-DC power converters to each of the available electrolyser modules toward the target current set point. Steps (a) to (e) are repeated at appropriate time intervals. Thus, the operating power of the electrolyser modules is continually moving toward a target set point power, determined by estimating the real time available power generated by the wind farm, as well as the number of available electrolyser modules and their estimated performance. Each electrolyser module will have a characteristic current-voltage curve at any given operating temperature; consequently, the operating power of the electrolyser modules is set by setting the operating current, which in turn sets the operating voltage.

Computer simulation modeling using actual wind farm power generation data has shown that time intervals for repetition of steps (a) to (e) of the order of 1 to 10 seconds may be sufficient for systems with wind farms of 51 MW or 150 MW; as in any "integration" type process, the shorter the time interval, the better the control will be, and in this case, the better the power tracking and energy capture will be. In practice, the lower limit of the time interval will be set by the response of the controllers and the power measuring devices, and the number of commands; several hundred commands could be required for a 150 MW wind farm. For several hundred commands, the time interval could be up to several hundred ms. Accordingly, an approximate practical "best" range for the time interval for repetition of steps (a) to (e) may be, for example, 0.7-1 seconds for a 150 MW wind farm. Appropriate time intervals can be estimated in a similar manner for systems with wind farms of different nominal output powers.

The current ramp rate for each electrolyser module is also expected to be an important parameter. Computer simulation modeling using actual wind farm power generation data indicates that current ramp rates of at least about 0.5% of the nominal power rating, or at least about 0.25% of the peak power rating of the electrolyser modules, result in capture of very high percentages of the wind power generated. The magnitude of these current ramp rates corresponds to at least about 19 A/s. Thus, the use of electrolyser modules capable of achieving high current ramp rates is preferred. Allowable current ramp rates may vary with operating temperature. The allowable current ramp rate as a function of operating temperature also can be expected to vary for different electrolyser module designs.

The electrolyser modules have an operating current window that is defined by the nominal current (power) rating at the high end, and by the minimum current (power) turn down at the low end. The nominal current (power) rating of an electrolyser module is determined by the ratings of internal functional components, and by its ability to generate gases with good fluids circulation, good gas-liquid separation, and without overheating. The minimum current turn down capability of an electrolyser module is determined by its ability to generate hydrogen gas with good purity, as well as the operating efficiency curve of the associated power conversion equipment. Preferably, the operating current should not extend outside of the operating current window for any extended periods. Accordingly, use of electrolyser modules with a wide operating current window, for example, in terms of current density, 0.1-1.0 A/cm$^2$, is advantageous. An appropriate large scale electrolyser module design with a wide operating current window is described in co-pending application, which is incorporated herein in its entirety.

Another important aspect of the control strategy that facilitates good wind power tracking and high energy capture is distribution of the total power evenly over all the available electrolyser modules. This approach minimizes the magnitude of power fluctuations seen by each electrolyser module, thereby maximizing power tracking capability for any given current ramp rate. The approach also maximizes "head room" to accommodate sudden wind power increases, and further, maintains the current set points as low as possible for each electrolyser module, thereby maximizing the efficiency of the electrolyser modules.

Tracking of low power generated by the wind farm can be improved through extending the effective overall operating current window downward by turning off one or more electrolyser modules after a time delay if the current set point is less than an established low minimum current. (Here, an "established" parameter refers to a fixed parameter in the control logic that is set by the designer and used throughout the control.) If the current set point increases above an established high minimum current, one or more of the electrolyser modules that were turned off is turned back on after a time delay. The time delays and the range between the established low minimum current and the established high minimum current help to minimize instances in which electrolyser modules are turned on and off with high frequency. In this regard, the run times of the multiple electrolyser modules are evened out (by separate control logic); that is, they are made as equal as possible over time. Further, any on-off operation of each of the multiple electrolyser modules is spaced out over time (by other separate control logic). Electrolyser modules may also be operated at minimum current if an alarm condition(s) is encountered. Alarm conditions may include, but are not limited to, high or low temperature, pressure or liquid level. The purpose of operating any alarmed electrolyser modules at minimum current is to provide a safe operating condition that could "self heal" and allow the electrolyser module to return to normal operating status. Any electrolyser modules in alarm condition are reinstated to normal operation if the alarm condition(s) corrects itself. If the alarm condition(s) does not correct itself, the electrolyser module(s) condition is elevated to fault state, and the electrolyser module(s) is turned off.

Control Function Steps Description

The main control function steps are outlined in FIG. 3. There are three main control blocks, each of which is described below in terms of (i) real time data inputs; (ii) characteristic data; (iii) control outputs; and, (iv) control logic and control actions.

Figure 4:
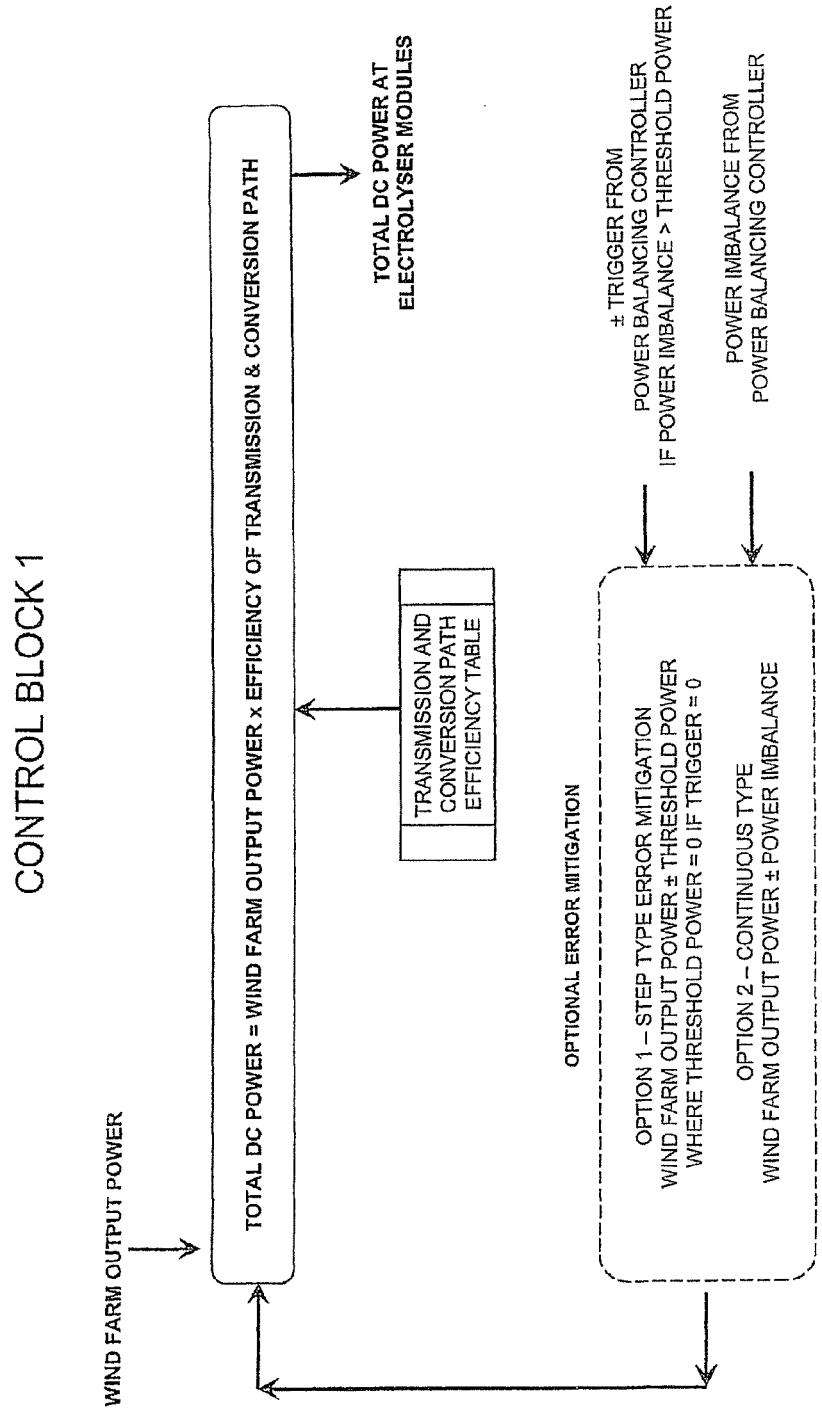
FIG. 4 outlines the first main control block of a method for controlling a system for distributing electric power generated by a wind farm to multiple electrolyser modules in accordance with the present invention.

Control block 1 is outlined in FIG. 4. In control block 1, the real time available DC wind power is estimated. The real time data input are measured, estimated, or predicted total wind farm output power at regular intervals, for example, every second or more frequently—(the finer the time interval, the better the power tracking will be). Characteristic data required, preferably but not necessarily provided in the form of a lookup table, are the efficiency of the power conversion path from the point of wind farm power determination to regulated DC power input to the electrolyser modules, as a function of power level. The control logic is: total DC power input to electrolyser modules=wind farm output power×efficiency of the power conversion path.

If an error mitigation method is employed, then the wind farm output power is adjusted by an amount determined by a signal from the power balancing controller. In the case of a step type error mitigation method, a digital signal will adjust the value of the wind farm output power by the threshold power positive or negative depending on the direction of the imbalance. In the case of the continuous error mitigation method, an analog signal proportional to the positive or negative power imbalance will adjust the wind farm output power by that amount.

Figure 5:
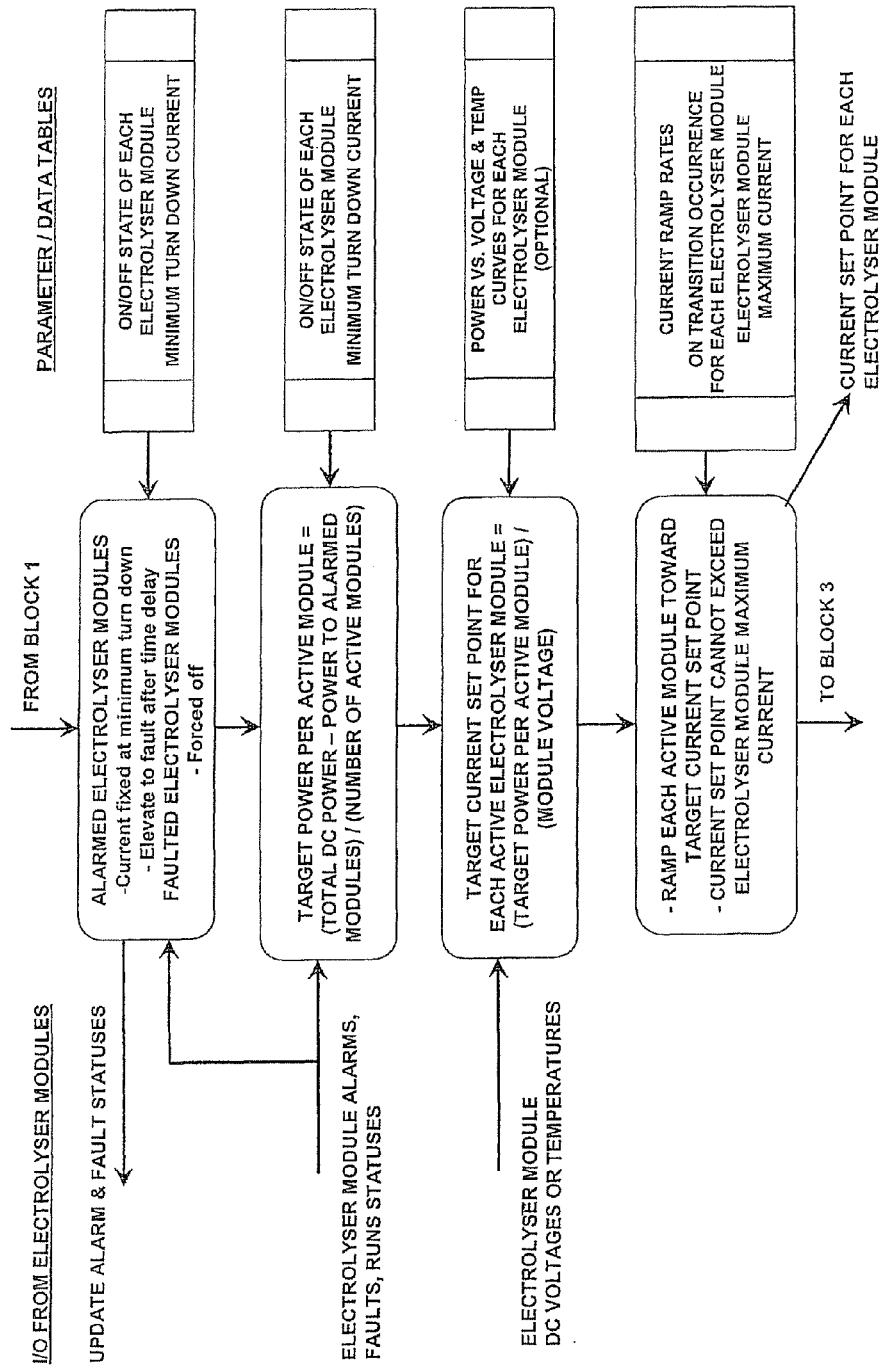
FIG. 5 outlines the second main control block of a method for controlling a system for distributing electric power generated by a wind farm to multiple electrolyser modules in accordance with the present invention.

Control block 2 is outlined in FIG. 5. In control block 2, electrolyser module current target set points are determined for the available electrolyser modules and the electrolyser modules are ramped toward the target set points. The real time data input are: (i) real time DC voltage of each electrolyser module; (ii) optionally, real time temperature of each electrolyser module; and (iii) alarm, fault and run status of each electrolyser module. Characteristic data are: (i) the minimum allowable turn down current for the electrolyser modules; (ii) the on transition occurrence for each electrolyser module; (iii) the maximum current setting for the electrolyser modules; (iv) the on'off state for each electrolyser module; (v) appropriate current ramp rates; and optionally, (vi) voltage versus current versus temperature for the electrolyser modules. The control outputs are the current set point to each electrolyser module.

The control logic for control block 2 is: target power per active electrolyser module=(total DC power−power to alarmed electrolyser modules)/(number of active electrolyser modules), where the active electrolyser modules are those that are operating and are not in an alarm or fault condition; that is, number of active electrolyser modules=(total number of electrolyser modules)−(number of alarmed and faulted electrolyser modules)−(number of fully off electrolyser modules). Corresponding control actions are as follows: (i) electrolyser modules in alarm state will operate fixed at minimum turn down setting; (ii) time out alarm state actions are (a) if recovered, then clear alarm status, and (b) if not recovered, then elevate to fault state; (iii) electrolyser modules in fault state will always be off; (iv) the target power will be divided evenly between available electrolyser modules, compensating for alarmed electrolyser modules running at the minimum turn down current; (v) determine the target current set point for each electrolyser module from the target power divided by the voltage—if accurate voltage versus current versus temperature data are available, they can be used to estimate the voltage at the next current iteration—otherwise, actual electrolyser module voltages will be used; (vi) ramp the current of each available electrolyser module toward the target current—the current cannot exceed the maximum electrolyser module current. The allowable current ramp rate for the electrolyser module operating temperatures also may be checked or determined.

Figure 6:
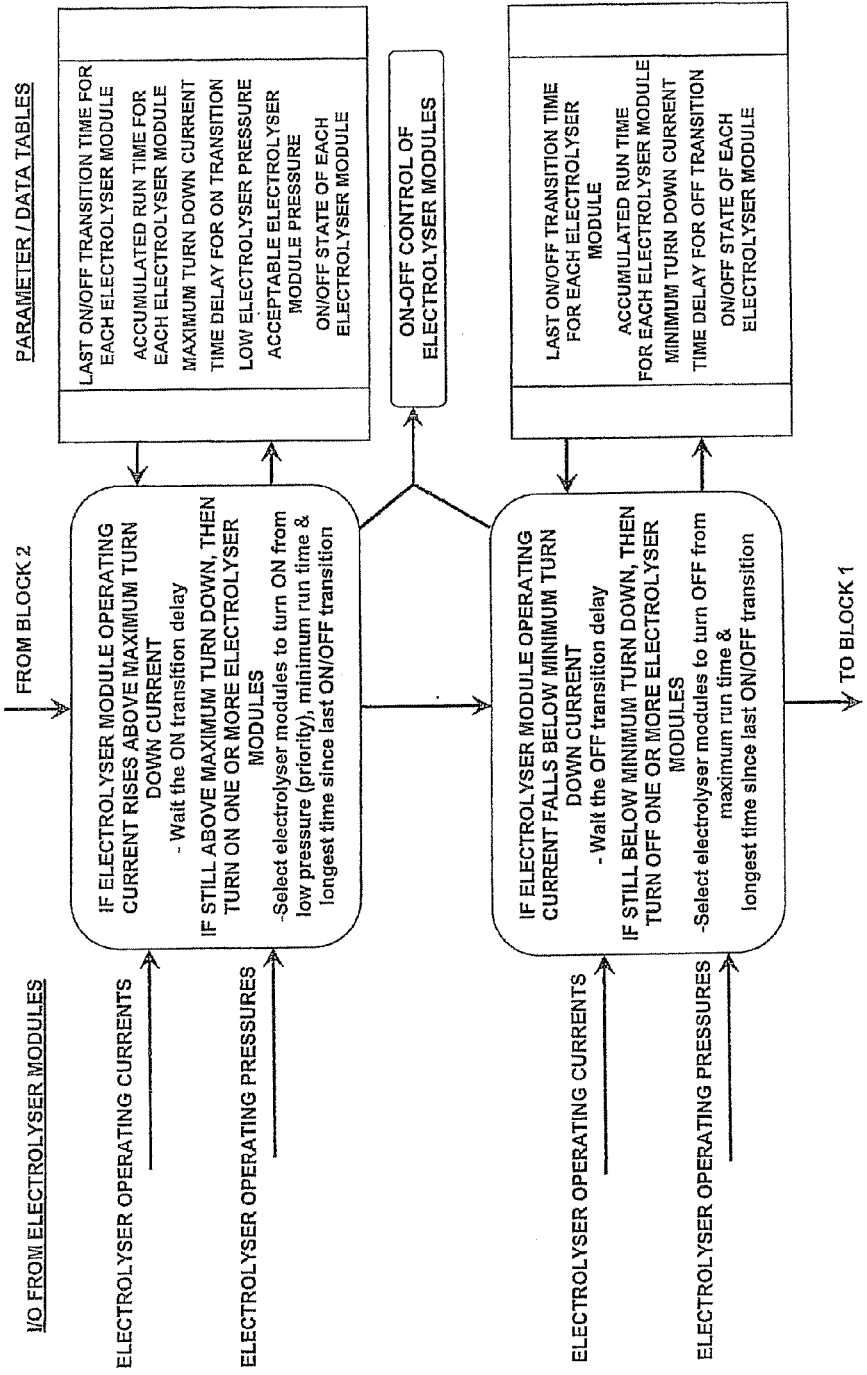
FIG. 6 outlines the third main control block of a method for controlling a system for distributing electric power generated by a wind farm to multiple electrolyser modules in accordance with the present invention.

Control block 3 is outlined in FIG. 6. In control block 3, electrolyser modules are turned on or off based on the current setting, the operating pressure, and on-off and run time tables for the electrolyser modules. The real time data input are the operating current and pressure of each electrolyser module. Characteristic data are: (i) the minimum allowable turn down current for the electrolyser modules; (ii) the maximum allowable turn down current for the electrolyser modules; (iii) the time delay to decide an on transition of one or more electrolyser modules; (iv) the time delay to decide an off transition of one or more electrolyser modules; (v) the acceptable operating pressure range; (vi) the on or off state of each electrolyser module; and, (vii) the last on-off transition time and accumulated run time for each electrolyser module. The control outputs are control of the on-off transitions of each electrolyser module.

The control logic and control actions for control block 3 are as follows. If the actual operating current of an electrolyser module rises above an established high minimum current, then: (i) wait the on transition delay; (ii) if the current set point is still above the established high minimum value, then turn on one or more electrolyser modules; (iii) if the operating pressure of one or more electrolyser modules is below the acceptable operating pressure range, then choose those electrolyser modules to be turned on; (iv) otherwise, choose which electrolyser modules to turn on based on minimum run time and the longest time since the last on-off transition. If the actual operating current of an electrolyser module falls below an established low minimum current, then: (i) wait the off transition time delay; (ii) if the current is still below the established low minimum current, then turn off one or more electrolyser modules; (iii) choose which electrolyser modules to turn off based on maximum run time and the longest time since the last on-off transition; (iv) keep electrolyser modules with low pressure on until the pressure reaches the acceptable operating pressure range.

Further, a control interface would have access to real time operating data for the system, including: (i) the total AC wind farm power and corresponding DC power after losses; (ii) the actual total DC power to the electrolyser modules; (iii) the difference between the wind farm corresponding DC and actual DC power to the electrolyser modules, indicating the level of success of power tracking; (iv) accumulated energy figures for (i) to (iii). A control interface also would have access to real time operating data for each electrolyser module, including: (i) on-off, alarm or fault status for each electrolyser module; (ii) alarm and fault conditions detailed as to cause; (iii) on-off transition times and run times; (iv) operating current, voltage, temperature and pressure.

EXAMPLE 1

A power distribution system according to the present invention was simulated by a computer model, using data from a nominal 51 MW wind farm. Second-by-second data for one week, high yield and low yield periods were used. The power transmission and conversion path efficiency was assumed to be flat at 97%. The electrolyser modules were rated at 3 MW maximum (7,500 A and nominal 400 V). The number of electrolyser modules used was 17. The cell voltage was assumed to be 2.0 V/cell at all operating currents as an approximation. The electrolyser module current ramp rate was 0.5% of the maximum current per second, or 37.5 A/s based on the maximum current of 7,500 A. The electrolyser module low minimum current was 375 A (5% of the maximum current) and the high minimum current was 562.5 A (7.5% of the maximum current). The delay time for a decision to turn an electrolyser module on or off was 10 seconds. The electrolyser modules were turned on or off one at a time. The time interval for repetition of the basic control algorithm was one second. In this initial modeling, the effects of power measurement delay and error were neglected.

The power capture for the high yield week was generally about 98% or better at any given time, and the cumulative energy capture was 99.96%. (These values are separate from the 3% losses associated with the power transmission and conversion path.) The electrolyser modules were operating 97% of the time on average during the high yield week, with an average on-off transition frequency of 21 hours. The power capture for the low yield week was generally about 99.5% or better at any given time, and the cumulative energy capture was 99.74%. The electrolyser modules were operating 40% of the time on average during the low yield week, with an average on-off transition frequency of 2 hours.

EXAMPLE 2

Next, the effect of varying the current ramp rate in the computer model simulation of Example 1 was investigated. The effects of power measurement delay and error were again neglected. The results are shown in Table 1. Current ramp rates greater than or equal to 0.25% of the maximum current rating of 7500 A resulted in overall energy capture of 99.5% or better; ramp rates greater than or equal to 0.5% of the maximum current rating resulted in overall energy capture of 99.7% or better; and, ramp rates of 1% resulted in overall energy capture of 99.85% or better.

TABLE 1

Effect of Current Ramp Rate on Capture of Energy from a 51 MW Wind Farm During High Yield and Low Yield Weeks

| Current Ramp Rate (A/s) | 1.88 | 3.75 | 7.5 | 18.75 | 37.5 | 75 |
|---|---|---|---|---|---|---|
| Current Ramp Rate (% of Maximum Current) | 0.025% | 0.05% | 0.1% | 0.25% | 0.5% | 1% |
| % Energy Capture - Low Yield Week | 94.65 | 97.46 | 98.91 | 99.54 | 99.74 | 99.85 |
| % Energy Capture - High Yield Week | 98.86% | 99.44 | 99.76 | 99.92 | 99.96 | 99.97 |

EXAMPLE 3

Next, the effect of varying the frequency of estimating the real time available DC power from the wind farm in the computer model simulation of Examples 1 and 2 was investigated for a current ramp rate of 0.5% of the maximum current rating of 7,500 A. The results are shown in Table 2. The higher the estimation frequency, the lower the losses. Higher losses were observed for the low yield week than for the high yield week.

TABLE 2

Effect of Frequency of Estimating the Real Time Available DC Power from a 51 MW Wind Farm during High Yield and Low Yield Weeks

| Frequency of Estimation (s) | 1 | 2 | 4 | 8 | 16 |
|---|---|---|---|---|---|
| % Loss of Wind Energy - Low Yield Week | 0.26 | 0.39 | 0.52 | 0.72 | 1.01 |
| % Loss of Wind Energy - High Yield Week | 0.04 | 0.10 | 0.15 | 0.23 | 0.32 |

EXAMPLE 4

Next, the computer simulation model was extended to cover a full year. Second-by-second data for a 51 MW wind farm over two consecutive 6 month periods were used. The power transmission and conversion path efficiency was assumed to be flat at 97%. The electrolyser modules were rated at 3 MW maximum (7,500 A and nominal 400 V). The number of electrolyser modules used was 17. The cell voltage was assumed to be 2.0 V/cell at all operating currents as an approximation. The electrolyser module current ramp rate was 0.5% of the maximum current per second, or 37.5 A/s based on the maximum current of 7,500 A. The electrolyser module low minimum current was 375 A (5% of the maximum current) and the high minimum current was 562.5 A (7.5% of the maximum current). The delay time for a decision to turn an electrolyser module on or off was 10 seconds. The electrolyser modules were turned on or off one at a time. The time interval for repetition of the basic control algorithm was one second.

The nominal capacity factor of the wind farm for the full year was 36.8%. The electrolyser modules were on 80% of the time. The power capture for both the first and second six month periods was 99.97%, respectively. (These values are separate from the 3% losses associated with the power transmission and conversion path.) There was negligible requirement for alternative power supply for this ideal case, in which power measurement delays and errors are neglected.

A voltage-current relationship for the electrolyser module cells was then added to the computer simulation model (as opposed to assuming a constant cell voltage of 2.0 V/cell over the operating range of current densities). The power captures for the first and second six month periods were almost unchanged, at 99.96% and 99.97%, respectively. (These values are separate from the 3% losses associated with the power transmission and conversion path.) There was negligible requirement for alternative power supply.

EXAMPLE 5

Next, the effects of power measurement delay and/or error, as well as the effects of step type error mitigation, were modeled using data for a half year. The results are shown in Table 3. The largest requirement for alternative loads was 0.94% of the total wind energy, even with a large power measuring error of 5% plus a power measuring delay of 1 second. Step type error mitigation with a +/−70 kW threshold reduced the requirement for alternative load by 31% to 0.65% of the total wind energy. The largest requirement for alternative power supply was 0.22% of the total wind energy, even with a large power measuring error of 5% plus a power measuring delay of 1 second. Step type error mitigation with a +/−70 kW threshold reduced the requirement for alternative power source by 18% to 0.18% of the total wind energy

TABLE 3

Effect of Power Measurement Delay and Error on Requirement for Alternative Load and Alternative Power Source for a 51 MW Wind Farm Over a Half Year of Operation

| Case | Energy to Alternative Load (% of Total Wind Energy) | Energy to Alternative Power Source (% of Total Wind Energy) |
| --- | --- | --- |
| No Power Measuring Delay or Error | 0.039 | 0 |
| Delay of 1 s | 0.175 | 0.14 |
| Delay of 1 s + Error of 1% | 0.23 | 0.17 |
| Error of 5% | 0.92 | 0.20 |
| Error of 5% + Delay of 1 s | 0.94 | 0.22 |
| Step Type Error Mitigation +/−70 kW Threshold - 5% Error | 0.64 | 0.17 |
| Step Type Error Mitigation +/−70 kW Threshold - 5% Error + Delay of 1 s | 0.65 | 0.18 |

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

The invention claimed is:

1. A method for controlling the distribution of electric power from a wind farm generating at least one of medium to high voltage AC electricity and medium voltage DC electricity to a plurality of electrolyser modules for producing hydrogen, comprising the steps of:
   a. estimating the real time available DC power from the wind farm, the real time available DC power controlled independently from the electrolyser modules;
   b. determining the number of available electrolyser modules;
   c. measuring at least one of the temperature and the voltage of each electrolyser module;
   d. determining a target current set point for each of said plurality of electrolyser modules based on the estimated available DC power, the number of available electrolyser modules, and the voltage of each of said available electrolyser modules;
   e. controlling the DC current supplied by at least one DC-DC power converter to each of said available electrolyser modules to bring the DC current to said target current set point; and
   f. periodically repeating steps a to e during operation to compensate for changes in the real time available DC power from the wind farm.

2. The method of claim 1, further comprising the step of turning off at least one electrolyser module after a time delay if said current set point is less than an established low minimum value.

3. The method claimed in claim 2, further comprising the step of turning back on at least one electrolyser module after a time delay if said current set point is greater than an established high minimum value.

4. The method of claim 3, further comprising the step of choosing which of said electrolyser modules to turn on based on at least one of low operating pressure, minimum run time and longest time since the last on-off transition.

5. The method of claim 2, further comprising choosing which of said electrolyser modules to turn off based on at least one of maximum run time and longest time since the last on-off transition.

6. The method claimed in claim 1, further comprising the step of reducing the current set point of any of said plurality of electrolyser modules in an alarm condition to a minimum current.

7. The method claimed in claim 6, further comprising the step of reinstating any of said electrolyser modules in the alarm condition to normal operation if said alarm condition corrects itself.

8. The method claimed in claim 1, further comprising the step of determining a power imbalance above a threshold power imbalance level, and adjusting the power to said electrolyser modules by said threshold power imbalance level in the direction to correct said power imbalance.

9. The method claimed in claim 1, further comprising the step of determining an actual power imbalance and adjusting the power to said electrolyser modules proportionately to correct said power imbalance.

10. A method for controlling distribution of electric power from a wind farm to a plurality of hydrogen producing electrolyser modules comprising:
   estimating an amount of DC power available from the wind farm, the wind farm controlled independently from the electrolyser modules;
   identifying a number of available electrolyser modules;
   measuring a voltage of each electrolyser module;
   determining a target current for each electrolyser module based on the estimated amount of DC power available from the wind farm, the identified number of available electrolyser modules, and the measured voltage of each electrolyser module;
   controlling DC current supplied by at least one DC-DC power converter to each of the available electrolyser modules to bring the DC current to the target current; and
   periodically repeating the method to compensate for changes in the amount of DC power available from the wind farm.

11. The method of claim 10, wherein the method is incapable of controlling the amount of DC power available from the wind farm.

12. The method of claim 10, further comprising inactivating at least one electrolyser module after a time delay if the target current is less than a minimum value.

13. The method of claim 12, further comprising selecting which electrolyser module to inactivate based on at least one of maximum run time or longest time since last on-off transition.

14. The method of claim 12, further comprising reactivating at least one inactivated electrolyser module after a time delay if the target current is greater than a maximum value.

15. The method of claim 14, further comprising selecting which electrolyser to reactivate based on at least one of low operating pressure, minimum run time, or longest time since the last on-off transition.

16. The method of claim 10, further comprising reducing the target current of one or more of the electrolyser modules to a minimum current during an alarm condition, and restoring the target current after the alarm condition has ceased.

17. The method of claim 10, further comprising identifying a current imbalance across the electrolyser modules and adjusting the DC current supplied to the electrolyser modules to alleviate the current imbalance.

18. A method for controlling distribution of electric power from a wind farm to a plurality of hydrogen producing electrolyser modules comprising:
   determining a target current for each electrolyser module based on an estimated amount of DC power available from the wind farm, an identified number of available electrolyser modules, and a measured voltage of each electrolyser module;
   providing the target current to each of the available electrolyser modules, the target current provided by at least one DC-DC power converter; and
   modifying the target current in response to a change in the amount of DC power available from the wind farm, and providing the modified target current to each of the available electrolyser modules;
   wherein the DC power available from the wind farm is controlled independently of the method.

19. The method of claim 18, wherein the DC power available from the wind farm is uncontrollable by the method.

20. The method of claim 18, further comprising inactivating at least one electrolyser module after a time delay if the target current is less than a minimum value.

* * * * *